US009500082B2

(12) United States Patent
Pernleitner et al.

(10) Patent No.: US 9,500,082 B2
(45) Date of Patent: Nov. 22, 2016

(54) BLADE RING SEGMENT HAVING AN ANNULAR SPACE DELIMITING SURFACE HAVING A WAVY HEIGHT PROFILE

(71) Applicant: MTU Aero Engines GmbH, Munich (DE)

(72) Inventors: Martin Pernleitner, Dachau (DE); Christian Bichlmaier, Greifenberg (DE); Carsten Zscherp, Groebenzell (DE)

(73) Assignee: MTU Aero Engines AG, Munich (DE)

( * ) Notice: Subject to any disclaimer, the term of this patent is extended or adjusted under 35 U.S.C. 154(b) by 681 days.

(21) Appl. No.: 13/804,217

(22) Filed: Mar. 14, 2013

(65) Prior Publication Data

US 2013/0243602 A1 Sep. 19, 2013

(30) Foreign Application Priority Data

Mar. 15, 2012 (EP) .................... 12159601

(51) Int. Cl.
*F01D 5/14* (2006.01)
*F01D 5/22* (2006.01)
*F01D 5/02* (2006.01)
*B23H 3/00* (2006.01)
*B23H 9/10* (2006.01)
*F01D 25/28* (2006.01)

(52) U.S. Cl.
CPC ........ *F01D 5/02* (2013.01); *B23H 3/00* (2013.01); *B23H 9/10* (2013.01); *F01D 5/143* (2013.01); *F01D 5/225* (2013.01); *F01D 25/28* (2013.01); *F05B 2230/101* (2013.01); *F05D 2230/10* (2013.01); *Y02T 50/673* (2013.01)

(58) Field of Classification Search
CPC .......... F01D 5/143; F01D 5/145; F01D 5/16; F01D 5/225; F01D 5/02; F01D 25/28
USPC ....................................................... 416/195
See application file for complete search history.

(56) References Cited

U.S. PATENT DOCUMENTS

| 3,723,268 | A | 3/1973 | Johns et al. |
| 5,149,405 | A | 9/1992 | Bruns et al. |
| 6,561,761 | B1* | 5/2003 | Decker ................ F04D 29/681 415/173.1 |
| 2004/0120823 | A1* | 6/2004 | Warner .................. F01D 5/143 416/223 R |
| 2005/0249593 | A1* | 11/2005 | Boury .................... B22C 9/103 416/97 R |
| 2006/0233641 | A1* | 10/2006 | Lee ......................... F01D 5/143 415/208.1 |
| 2009/0211921 | A1 | 8/2009 | Platz et al. |
| 2010/0303627 | A1* | 12/2010 | Megerle .................. F01D 5/143 416/179 |
| 2011/0142652 | A1* | 6/2011 | Bock ........................ F01D 5/16 416/183 |

FOREIGN PATENT DOCUMENTS

| DE | 1816216 | 10/1969 |
| EP | 1559871 | 8/2005 |

* cited by examiner

*Primary Examiner* — Bryan Lettman
*Assistant Examiner* — Timothy Solak
(74) *Attorney, Agent, or Firm* — Davidson, Davidson & Kappel, LLC

(57) ABSTRACT

A method for machining a workpiece. An electrode is moved linearly in the direction of the workpiece to cause material to be removed from the workpiece, at least one end of a surface of the workpiece running obliquely to a guide edge of the electrode machining this surface. The electrode is moved at least partially with the electrode surface parallel to the surface, so that during the approach to the workpiece, areas of the workpiece having an irregular edge machined at a different intensity are formed, the difference in intensity of machining on the edge of the surface to be machined being compensated in that the surface to be machined is provided with a height profile adapted to the shape of the end of the surface to be machined. A blade ring segment and blade ring is also disclosed.

5 Claims, 3 Drawing Sheets

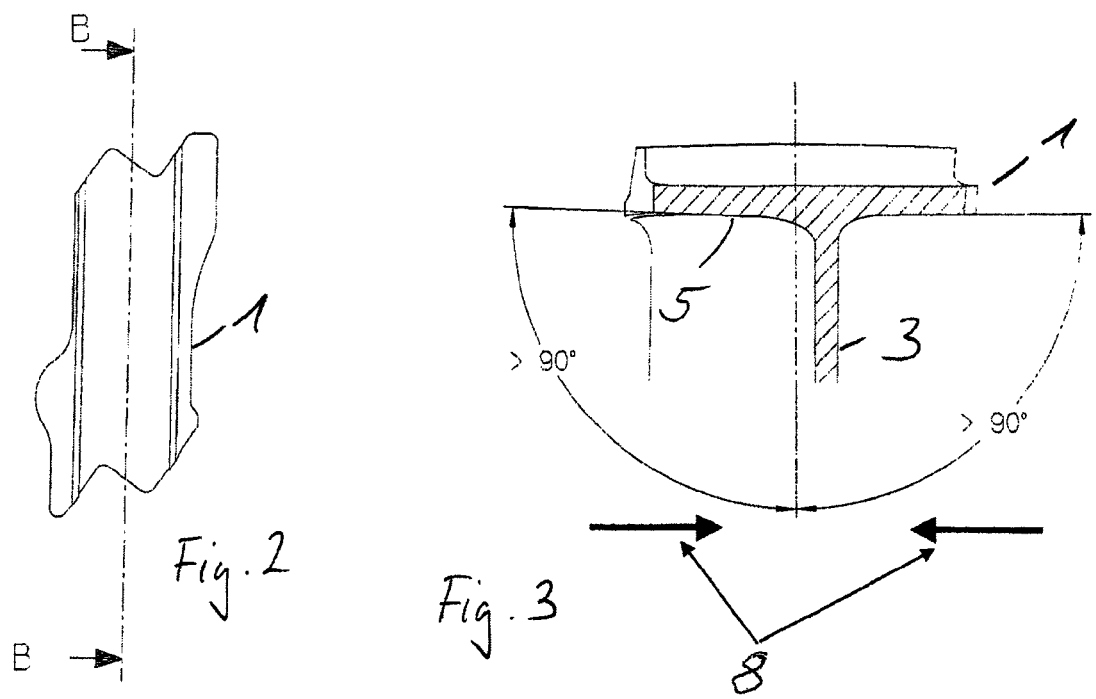
Fig. 2
Fig. 3
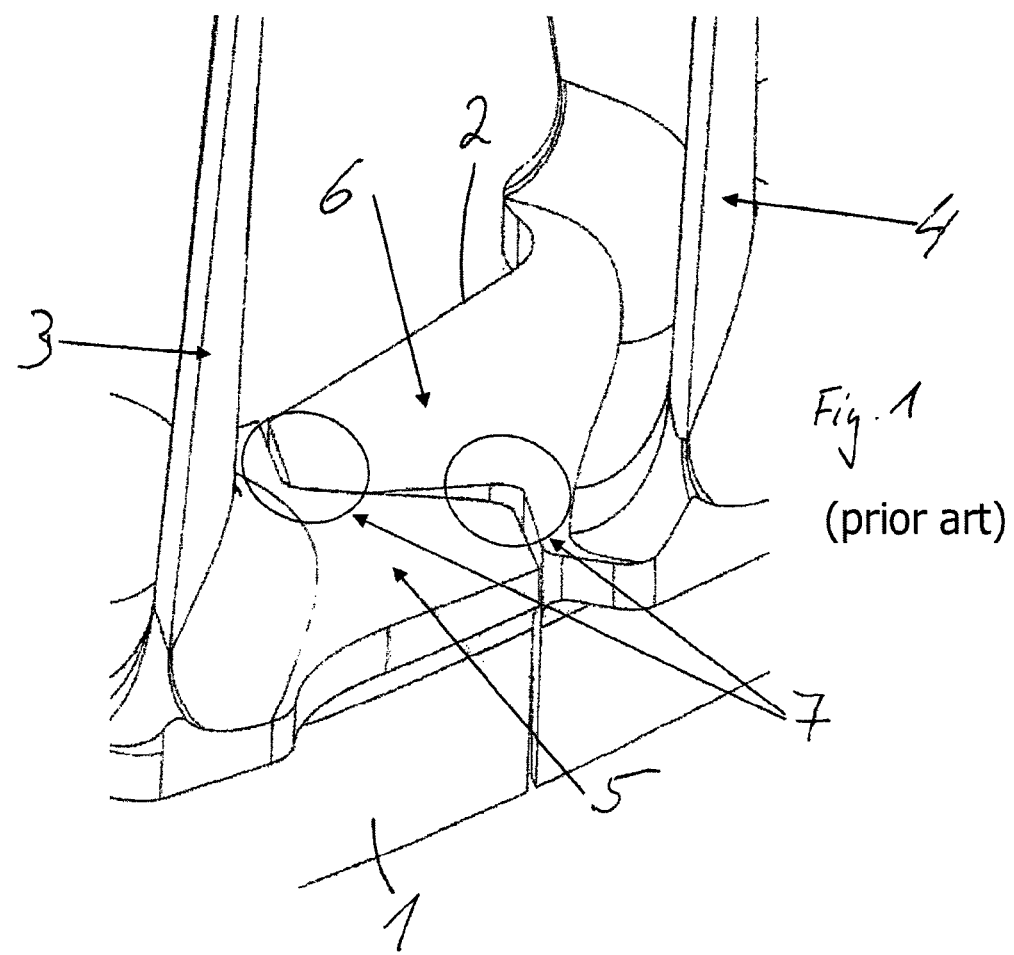
Fig. 1
(prior art)

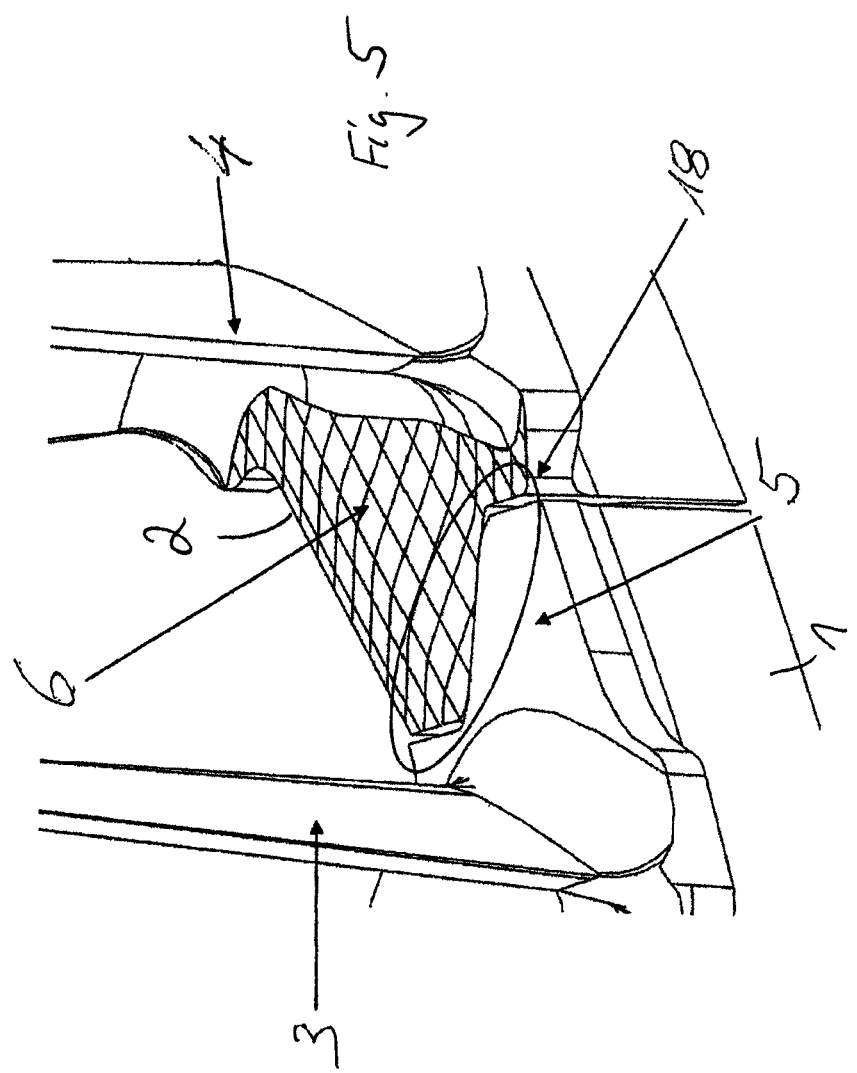

US 9,500,082 B2

BLADE RING SEGMENT HAVING AN ANNULAR SPACE DELIMITING SURFACE HAVING A WAVY HEIGHT PROFILE

This claims the benefit of European Patent Application EP 12159601.9, filed Mar. 15, 2012 and hereby incorporated by reference herein.

The present invention relates to a method for machining a workpiece, in which an electrode is situated at a distance from the workpiece to be machined and is moved linearly in the direction of the workpiece to be machined to cause material to be removed from the workpiece during the approach to the workpiece, at least one end or one section of one end of a surface of the workpiece to be machined running obliquely to a guide edge of the electrode machining this surface, and the electrode is moved at least partially with the electrode surface parallel to the surface to be machined, so that, during the approach to the workpiece, areas of the workpiece having an irregular edge occur as a result of being machined at a different intensity. Furthermore, the present invention relates to blade ring segments for a blade ring of a turbomachine and a corresponding blade ring, the blade ring segments being manufactured with the aid of the method defined above.

BACKGROUND

For turbomachines such as gas turbines or aircraft engines, blade rings may be used in which a plurality of blade ring segments is assembled, each having at least one blade and an inner shroud and/or an outer shroud to form a blade ring. The blade profiles of the individual blade ring segments define an annular space between them through which the working gas flows, the annular space being delimited by the shrouds, and the shrouds have corresponding annular space delimiting surfaces.

Such blade ring segments are manufactured by casting or forging according to the prior art, forging being necessary to increase the strength when using newer and lighter materials in particular, e.g., TiAl materials. Blade ring segments manufactured accordingly must be remachined mechanically to achieve the desired surface shape by using electrochemical machining methods, for example, in which electrochemical material removal from the workpiece surface to be machined is achieved with the aid of working electrodes and suitable electrolytes. During electrochemical machining, the working electrode is brought in a linear movement close to the surface of the workpiece to be machined, so that a corresponding material removal takes place due to the potential set between the working electrode and the workpiece surface to be machined. Due to the linear movement of the electrode in the direction of the workpiece surface to be machined during the machining, the material removal varies, depending on the distance from the surface to be machined and the duration of the machining. Accordingly, due to a predefined path of movement of the electrode and the geometry of the blade ring segment, a height profile may develop along the end edge of shrouds of the blade ring segment, in particular in the case of end areas of outer shrouds, which are designed in a Z shape and are used for a form-locking connection of adjacent blade ring segments when the end edge of the shroud is situated at various distances from the electrode for different lengths of time. Due to the electrochemical machining of the shroud while the electrode is being moved over the Z-shaped end of the shroud, there is thus removal of different amounts of material along the Z-shaped edge, so that in the case of adjacent blade ring segments, steps appear between the annular space delimiting surface, which results in a negative influence on the flow conditions in the annular space.

SUMMARY OF THE INVENTION

It is an object of the present invention to provide a method for machining a workpiece, while avoiding the corresponding problems, such as those defined in the related art, and this method is to be used in particular for machining blade ring segments for blade rings of turbomachines. In addition, blade ring segments and/or blade rings are to be provided in which the problem of steps between adjacent annular space delimiting surfaces on shrouds is avoided.

The present invention provides that during machining of a workpiece, for example, a blade ring segment using at least one electrode which is situated at a distance from the workpiece to be machined and is moved linearly in the direction of the workpiece to be machined, a difference in material removal and a corresponding development of an edge which is irregular with respect to the height profile may be counteracted in that, in the area of the machining of the edge at a different intensity, the surface to be machined is formed with a correspondingly counter-directional height profile according to the course of the edge. In other words, if the electrode moves with at least a fraction of its movement, i.e., with a subvector of the movement vector parallel to the surface of the workpiece to be machined, and if a section of the end of the surface of the workpiece to be machined is aligned obliquely to a guide edge of the machining electrode leading in the direction of movement of the electrode, then the case will occur that the electrode reaches certain areas of the workpiece surface to be machined sooner and machines them for a longer time or at a smaller distance than other areas, resulting in the material being removed at a different intensity there. This may be compensated by providing a height profile for the surface to be machined, so that the edge is corrected with respect to the height profile.

Accordingly, an elevated profile and therefore less material removal may be provided in areas which interact with the electrode for a longer period of time or starting at an earlier point in time, whereas in areas which interact with the electrode later or for a shorter period of time, there is greater material removal or a corresponding valley or a reduced height profile.

This method may be used with all methods in which electrodes are moved with respect to a workpiece surface to be machined accordingly, such as, for example, the electrochemical machining (ECM), erosion, electrodischarge machining (EDM) or electrochemical discharge machining (ECDM).

The method according to the present invention may be used in particular for machining blade ring segments of a blade ring having an outer shroud and/or an inner shroud, to adapt the edges of the shrouds of adjacent blade ring segments to one another.

This method may thus be used for mutual adaptation of the Z-shaped edges of adjacent shrouds of blade ring segments; a wavy topography may be provided according to the Z profile of one end of a shroud or a wavy height profile may be provided on the annular space delimiting surface of the shroud.

In the case of a direction of movement of the electrode across the end of the shroud having the Z-shaped profile, the wavy height profile of the annular space delimiting surface may be designed in such a way that peaks are provided at the protrusions of the Z profile and valleys are provided at the recessed areas of the Z profile. These peaks and valleys of the wavy height profile may be continued according to the direction of machining with which the electrode is moved with respect to the annular space delimiting surface, namely, for example, in the circumferential direction of the blade ring, for which the blade ring segment is provided when the direction of movement of the electrode is in this direction.

The wavy height profile may be provided in particular on the pressure-side annular space delimiting surface since the effects of the wave shape on the flow conditions have less impact there.

A corresponding blade ring having blade ring segments which have wavy annular space delimiting surfaces may be designed in such a way that straight planar annular space delimiting surfaces are adjacent to wavy annular space delimiting surfaces in alternation, the wavy annular space delimiting surfaces having an adaptation of the edge to the adjacent blade ring segment. Consequently, blade ring segments having a wavy annular space delimiting surface and a smooth planar annular space delimiting surface may be situated in alternation. In the same way, it is conceivable to provide blade ring segments having two wavy annular space delimiting surfaces in alternation, while the adjacent blade ring segment does not have any wavy annular space delimiting surface but instead has only smooth planar annular space delimiting surfaces. A smooth planar annular space delimiting surface is understood to be a surface which does not have any wavy adaptation of the surface topography according to the present invention.

The different configurations of the blade ring segments may be combined with one another accordingly, so that, for example, blade ring segments, each having a wavy annular space delimiting surface, are initially situated side by side and then there is a transition to an alternating configuration of blade segments having either two wavy annular space delimiting surfaces or having no wavy annular space delimiting surface.

BRIEF DESCRIPTION OF THE DRAWINGS

The accompanying drawings show the following in purely schematic representations:

FIG. 1 shows part of a blade ring of a turbomachine having adjacent blade ring segments according to the related art in a perspective representation;

FIG. 2 shows a top view onto a blade ring segment;

FIG. 3 shows a partial sectional representation of the blade ring segment from FIG. 2 according to sectional line B-B;

FIG. 5 shows a perspective representation similar to the representation in FIG. 1 having a wavy annular space delimiting surface according to the present invention.

DETAILED DESCRIPTION

Figure 4:
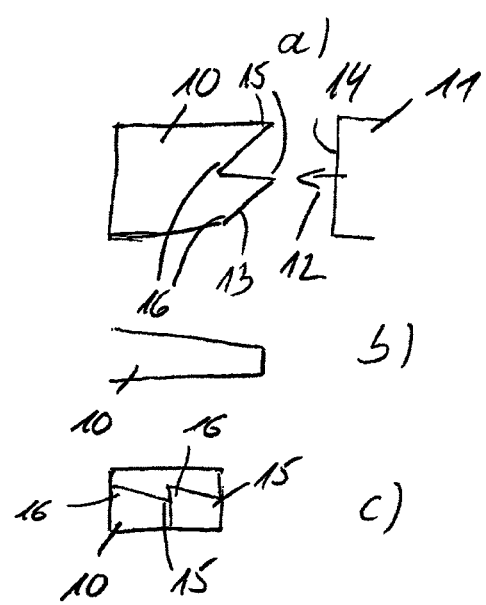
FIG. 4 shows a representation of ECM machining of a shroud having a Z-shaped end edge; the partial view a) shows a top view, the partial view b) shows a side view and the partial view c) shows a frontal view.

Additional advantages, characteristics and features of the present invention will become explicit in the following detailed description of one exemplary embodiment. However, the present invention is not limited to this exemplary embodiment.

FIG. 1 shows a part of a blade ring having two adjacent blade ring segments 1 and 2, such as those used in turbomachines, for example, gas turbines or aircraft engines. In the shown exemplary embodiment, adjacent blade ring segments 1 and 2 have two shrouds having annular space delimiting surfaces 5 and 6, which are designed to be complementary to one another at their end edges in a Z shape, so that blade ring segments 1 and 2 are joined together in a form-locked manner. This Z-shaped profile is usually provided on the outer shrouds, FIG. 1 being rotated by 180° for a better representation, so the outer shroud is shown at the bottom.

Blade ring segments 1 and 2 each have a blade profile 3 and 4, which are situated obliquely or transversely and/or with a curve with respect to the circumferential direction of the blade ring.

FIGS. 2 and 3 show a top view (FIG. 2) of a blade ring segment 1 as well as a sectional representation (FIG. 3) along sectional line B-B from FIG. 2.

In manufacturing the corresponding blade ring segments, they must undergo final machining to impart the shape in particular when the blade ring segments have been manufactured by forging technology to impart the required strength to the blade ring segments through forging. This is the case, for example, with blade ring segments that are to be manufactured from lightweight TiAl materials. Electrochemical machining methods may be considered as a possible method of machining the blade ring segments and in particular the blade profile surfaces and shroud surfaces 5 and 6, which delimit the so-called profile space between blade profiles 3, 4. During so-called electrochemical machining, ECM, one or multiple shape electrodes are situated near the workpiece surfaces to be machined and are moved in the direction of the workpiece surface up to a defined distance from it, so that material is removed at the workpiece surface to be machined due to an applied potential between the electrode and the workpiece surface in the presence of a suitable electrolyte. With respect to the material removal, the duration of machining and the distance of the electrode from the workpiece surface to be machined are essential.

FIG. 3 shows, for example, the direction of movement, indicated by arrows 8, or the direction of attack of the electrodes for the machining of the profile surfaces of blade profile 3 and annular space delimiting surface 5 of blade ring segment 1. The movement of the electrode during ECM machining is linear. With a certain configuration of the workpiece surface to be machined with respect to the working electrode during the approach, this may result in removal of different amounts of material in different areas of the workpiece surface. For example, at the ends of the shrouds having a Z profile, this will result in the edges of the annular space delimiting surfaces 5, 6 having a different height profile. In the case of adjacent blade ring segments 1 and 2, steps 7 may thus present in the contact areas of adjacent blade ring segments 1, 2, which are undesirable since they may have an unfavorable influence on the flow conditions in the annular space.

FIGS. 4a through 4c schematically show once again how stages 7 may be formed in adjacent ring segments 1, 2. FIG. 4a shows the top view onto a shroud 10 having a Z-shaped end edge 13, where a working electrode 11 is being displaced over shroud 10 for machining shroud 10 according to the direction of movement characterized by movement arrow 12. This need not be a strictly parallel movement of electrode 11 along shroud 10 or the surface to be machined but in principle a movement component, i.e., a movement subvector, in accordance with direction of movement 12 is sufficient. FIG. 4a shows clearly that electrode 11 with its guide edge 14 in the case of Z-shaped end edge 13 initially reaches protruding tips 15 of the Z profile, so that machining, i.e., material removal, begins there. With additional movement in the direction of movement 12, the machining proceeds so that end edge 13 is reached in the area of indentations or recesses 16 and the machining, i.e., material removal, begins there. However, the movement of electrode 11 in the direction of movement 12 produces a wedge-shaped removal as illustrated in subfigure b) of FIG. 4. Since edge 13 does not run perpendicularly to direction of movement 12, this results in an image showing that a great deal of material removal has taken place in the area of tips 15 in the frontal view, i.e., in a view according to direction of movement 12, whereas a lesser material removal has occurred in the area of recessed areas 16, resulting in a height profile of edge 13. Since machining takes place in the same way in an adjacent blade ring segment, this yields the steps shown in FIG. 1 in the contact areas, but this is undesirable.

The present invention now proposes to correct the height profile at the edge or adjust it to an adjacent blade ring segment, so that a wavy height profile is established on at least one annular space delimiting surface of a blade ring segment. This is illustrated in FIG. 5. In the specific embodiment shown here, the pressure-side annular space delimiting surface 6 of blade ring segment 2 is designed with a wavy shape, whereas the adjacent annular space delimiting surface 5 is designed to be smooth on the intake side of blade ring segment 1. The wavy shape of annular space delimiting surface 6 is adapted to the edge, so that a peak in the height profile is formed in the area of the protruding edge, i.e., in the area of protrusions 15, whereas valleys in the topography of the wavy height profile of annular space delimiting surface 6 are formed in the area of recesses 16. The wavy height profile of annular space delimiting surface 6 continues in accordance with the linear movement of the electrode and has an extent in the circumferential direction of the blade ring in the present specific embodiment, for example.

The amplitude of the wavy height profile depends on the radius of the blade ring, the number of blade ring segments, the shape angle and the shape inclination of the shroud and the Z shape of the end area of the shroud. For example, the smaller the radius of the blade ring or the smaller the number of blade ring segments, the more pronounced should be the design of the wavy height profile. The order of magnitude of the amplitude of a corresponding wavy height profile is in the range of 0.2 mm to 1 mm, preferably 0.4 mm to 0.8 mm or 0.5 mm to 0.6 mm with a blade ring diameter in the range of 400 mm to 450 mm and the number of blade ring segments being in the range of 75 to 80.

Although the present invention has been described in detail on the basis of the exemplary embodiment, it is self-evident to those skilled in the art that the present invention is not limited to this exemplary embodiment. Instead, modifications are possible in that individual features may be omitted or different combinations of features may be used without departing from the extent of protection of the accompanying claims. The present disclosure includes in particular all combinations of all individual features presented here.

What is claimed is:

1. A blade ring segment for a blade ring of a turbomachine comprising:
    at least one shroud, the at least one shroud delimiting an annular space with a side of the shroud facing a blade profile of a blade of the blade ring segment radially and defining at least one annular space delimiting surface on a pressure side or an intake side of the blade profile, the at least one annular space delimiting surface being designed with a wavy height profile, wherein the wavy height profile extends from a Z-shaped end edge of the at least one shroud, the wavy height profile having peaks in the area of the protrusions of the Z-shaped end edge and having valleys in the area of the indentations of the Z-shaped end edge, and the valleys and the peaks extending in the circumferential direction of the blade ring.

2. The blade ring segment as recited in claim 1 wherein the wavy height profile is formed on the pressure side annular space delimiting surface.

3. The blade ring segment as recited in claim 1 wherein the blade ring segment is forged.

4. A blade ring for a turbomachine comprising a plurality of blade ring segments as recited in claim 1, each blade ring segment having at least one shroud, the blade ring segments being situated in the blade ring in such a way that respective shrouds do not have any height offset at the contact points.

5. The blade ring as recited in claim 4 wherein the blade ring segments in the blade ring are situated in alternation with one respective annular space delimiting surface designed with a wavy height profile and one respective annular space delimiting surface designed with a planar profile, the respective wavy and planar annular space delimiting surfaces being adjacent to one another.

* * * * *